US005288119A

United States Patent [19]

Crawford, Jr. et al.

[11] Patent Number: 5,288,119

[45] Date of Patent: Feb. 22, 1994

[54] BATTERY REPLACEMENT AND MAGNETIC PICKUP APPARATUS

[76] Inventors: Thomas C. Crawford, Jr., 1422 Denison Dr., Norman, Okla. 73069; William T. Jones, Jr., 206 E. 15th, Irving, Tex. 75060

[21] Appl. No.: 964,670

[22] Filed: Oct. 22, 1992

Related U.S. Application Data

[63] Continuation-in-part of Ser. No. 780,814, Oct. 22, 1991, abandoned.

[51] Int. Cl.[5] .......... B23P 19/00; H01F 7/04

[52] U.S. Cl. .......... 294/65.5; 29/270; 29/402.08; 29/426.5; 29/744; 335/285

[58] Field of Search .......... 29/270, 271, 402.08, 29/426.5, 744, 758, 764, DIG. 95; 279/128, 158; 335/285, 295; 294/65.5; 81/6

[56] References Cited

U.S. PATENT DOCUMENTS

| | | | |
|---|---|---|---|
| 2,285,440 | 6/1942 | Kaiser | 250/106 |
| 2,471,764 | 5/1949 | Miller et al. | 294/65.5 |
| 2,547,990 | 4/1951 | Willms | 294/65.5 |
| 2,683,618 | 7/1954 | Long | 294/65.5 |
| 3,424,537 | 1/1969 | Henriksen | 401/142 |
| 3,652,173 | 3/1972 | Miller et al. | 401/110 |
| 3,789,336 | 1/1974 | Gordin | 335/285 |
| 4,813,729 | 3/1989 | Speckhart | 294/65.5 |
| 5,169,193 | 12/1992 | Stelmach | 294/65.5 |

*Primary Examiner*—Mark Rosenbaum
*Assistant Examiner*—S. Thomas Hughes
*Attorney, Agent, or Firm*—Hubbard, Tucker & Harris

[57] ABSTRACT

An apparatus for removing and replacing small batteries in electronic devices such as hearing aids or handling small magnetic parts has a housing in which a reciprocating shaft is placed having a magnet at one end. When the reciprocating shaft is placed in its extended pickup position, the magnet is brought close to the end of the housing, and into contact with the battery or other magnetic object. Once in contact with the object, the apparatus may be used for manipulation. Once the object is placed where it is to be left, the reciprocating shaft may be moved to a retracted position weakening the magnetic field holding the battery to the end of the apparatus. The reciprocating shaft is moved and locked into its extended and retracted positions with a rotating ratchet mechanism operated with a thumb of the hand that holds the apparatus. A shim in separable parts of the housing makes adjustment of the terminal end position of the magnet possible. A non-magnetic shield member or barrier layer surrounding the magnet at the tip effectively blocks the lateral attraction force so that only the object desired is picked up without disturbing surrounding objects.

17 Claims, 3 Drawing Sheets

BATTERY REPLACEMENT AND MAGNETIC PICKUP APPARATUS

CROSS REFERENCE TO RELATED APPLICATION

This is a continuation-in-part of our co-pending appliation Ser. No. 07/780,814, filed Oct. 22, 1991, now abandoned, entitled BATTERY REPLACEMENT APPARATUS for which benefit is claimed.

BACKGROUND OF THE INVENTION

The applicable art of the present invention relates generally to devices which aid in the removal of small batteries or handling small magnetic parts and prevents contamination of the battery surfaces with the fingers. Generally, batteries which are small, on the order of 3-5 mm in diameter and 1-3 mm in height are difficult to hold and more difficult to manipulate. Manipulation is required, however, when batteries are removed from the packages in which they are sold, or when they are installed in the various devices in which they are needed. A specific situation involves one piece hearing aids which are designed to fit within the ear.

Manipulation using the prior art necessarily entails touching the battery with the fingers, thereby contaminating the surface of the battery with oil. Such contamination interferes with the electrical contact of the battery with the contact terminals of the devices in which they are installed. Another specific situation involves photographic batteries which are required to be wiped with a cloth before being inserted in photographic equipment.

There is also need for a magnetic pickup device which can be used to pick up small fasteners, such as screws, which are used to fasten common objects such as eyeglasses, to make it easier for repairmen to handle them. Such a device is of particular value in making repairs to computer hardware and electronic assemblies which require the handling of small fasteners and parts which are difficult to place or remove because they are often located in crevices or other obstructed places. An additional requirement for handling computer or electronic parts is that the handling device be small, operable with one hand and able to retrieve or place parts without subjecting adjacent components to ranging stray magnetic fields which could cause damage or loss of programmed information. No present device is known which meets all of these requirements.

The prior art battery handling devices generally consist of a rigid or slightly flexible shaft having a lint brush at one end as shown in FIG. 1. More importantly, the shaft usually incorporates a magnet rigidly mounted in the center of the shaft with the axis of the magnet held perpendicular to the axis of the shaft. The magnet is included to provide a method to attract and hold small batteries so that they may be grasped by the user.

The prior art battery handling devices are inadequate for several reasons. First, due to the geometry of the batteries involved and the nature of magnetic forces, the batteries attracted to the magnet of the prior art device contact the magnet in an undesirable orientation. The magnet generally contacts the battery on its circumference; i.e., with the axis of the battery perpendicular to the longitudinal axis of the magnet. This makes it particularly difficult to pick up the battery and insert it in a socket which grips the circumferential edge of the battery without first manipulating it with the fingers.

Manipulation of the battery when attached to the magnet is unsatisfactory because it is time consuming and difficult. Further, it is unsatisfactory because many times the user of small batteries for health aid devices, such as hearing aids, are afflicted with arthritis or have unsteady hands. The lack of dexterity in these users further complicates the task of manipulating the battery temporarily connected to the prior art device.

Second, the orientation of the magnet with respect to the shaft in the prior art device, makes the accurate placement of the battery attached to the magnet difficult. Once a battery is manually oriented on the magnet by the user, the user must then press the magnet into the socket provided by the battery-powered device. A ninety degree orientation of the magnet to the shaft makes this placement difficult.

Third, the prior art handling devices do not provide for a method of easily removing the magnet from the battery once the battery has been put in place where it is to be left. This is especially troublesome when the user is attempting to use the prior art devices to place the battery in the socket provided by the battery-powered device. After the battery has been pressed into the socket, the prior art devices have a tendency to pull the battery from the socket when removal of the prior art device is attempted.

Fourth, small battery-powered devices, such as hearing aids, generally provide a "door" or "hatch" which serves as a holder for the batteries required for its operation. Once the battery is inserted into this holder, it is rotated into the device. The battery fits snugly in the "door" of the device and is usually held in place by a friction fit between the door and the circumference of the battery. When replacement of the battery is required, the door must be dislodged from the device and rotated into its open position for removal of the old battery and insertion of the new battery. As with the manipulation of a small battery, manipulation of the "door" on a small device, such as a hearing aid, can be difficult for persons with arthritis or those who have problems manipulating their hands. The prior art devices make no provision for opening the battery doors of small devices.

Fifth, it is desirable to provide a device which allows for attachment to, manipulation of and detachment from small batteries or other parts without the necessity of handling them with the fingers. They should pick up only from the end and not the side. Physically touching a battery with the fingers often leaves a deposit of oil which can interfere with the contacts of the battery. The prior art handling devices require physical manipulation of the battery with the fingers in order to place it in the correct orientation on a freestanding magnet. They naturally are drawn to the side rather than directly under the end.

Therefore, it is desirable to provide a device which allows for easy attachment and manipulation and release of small batteries and parts without the necessity of touching them. It is desirable to provide a feature which provides for the opening of "doors" on small battery-powered devices. It is desirable to provide a magnetic pickup device which is operable with one hand and small enough to reach into small openings without subjecting other adjacent components to stray laterally extending magnetic fields. This necessitates controlling the magnetic field while using a much stronger magnet than has heretofore been commercially available.

SUMMARY OF THE INVENTION

This invention provides a simple apparatus and method for attachment to various metallic batteries. The invention further possesses the attributes of making it easy to quickly remove the battery from the packaging in which it is sold and position the battery on a magnet in a desired orientation without the requirement that the battery be handled by the user. Further, the invention provides for an easy method of detachment from the battery. Additionally, the invention provides a means to easily open battery "doors" on small battery-powered devices. Further, the invention provides a method to manipulate batteries without contamination by the fingers.

A battery replacement and pickup apparatus has an elongated barrel having an open lower end. An elongated non-magnetic shaft is movable independently within the barrel between an extended position and a retracted position and has at least a hollow lower end portion for receiving a small powerful magnet formed to fit within the hollow portion. The magnet is preferably an extremely strong powerful magnet which makes it possible to reduce the diameter of the magnet and the attendant device while still providing a strong magnetic attraction force. The magnet is fitted within the hollow lower end portion of the movable shaft for moving therewith, said magnet being generally flush with the open lower end of the barrel for magnetic connection with a small battery or other magnetically attracted part when the movable shaft is moved to the extended position. A ratchet locking means operatively disposed within the barrel alternately holds the movable shaft in the extended or retracted position and biasing means located within the barrel above the open lower end urges the movable shaft towards the retraction position whereby a small battery or other small part may be picked up and securely held by contact with the magnet when the shaft is in the extended position and released by separation of the magnet from the battery or part when the shaft is in the retracted position. The magnet is preferably a neodymium based permanent magnet which is available in compositions having an attractive force which is approximately an order of magnitude greater than common ALNICO magnets, commonly available.

The barrel is preferably a cylindrical barrel, although the barrel may have a triangular cross-section or some other shape. The lower end portion of the barrel has a cylindrical cross-section surrounding the magnet contained therein in order to provide a smaller tip which will reach into small places and not interfere with cavities in which batteries may be placed in such things as cameras.

In the variation of the invention, the lower portion of the barrel is thickened around the magnet to an extent that effectively prevents the magnet from picking up a small battery which is located at the outer side surface of the lower open end of the barrel without reducing the magnetic pickup force at the open end so that when the magnet is in the extended position it will pick up a battery only at the open end of the barrel. That is to say that when the magnet is in the extended position, the magnetic attractive force provided by the magnetic field is directed longitudinally to a much greater extent than laterally. The reduction in lateral attractive forces is accomplished both by the separation between the magnet and the object caused by the thickened lower tip of the barrel and by the inhibiting or blocking effect caused by the plastic tip of the barrel or a non-magnetic shield which surrounds the magnet. Non-magnetic as defined herein means not attracted by a magnet. Magnetic material is material means material that is attracted by a magnet.

The blocking effect is enhanced by one of several means. The battery replacement and pickup apparatus may be provided with a magnet having an outer side surface covered with a non-magnetic barrier layer which effectively blocks lateral magnetic attractive force without reducing longitudinal magnetic attraction when the movable shaft is in the extended position. The non-magnetic barrier layer is preferably bismuth, lead, or predominantly bismuth or lead alloy or material of similar magnetic blocking characteristics. The non-magnetic barrier layer in combination with the lower portion of the barrel are selected to have a magnetic blocking effect which has a lateral magnetic attraction less the weight of a small hearing aid battery so that the device will not pick up a battery from the side in the event the open end is not placed directly on the battery when the magnet is extended.

In order to provide still a smaller diameter at the tip portion of a hand held battery replacement and lower end of the magnet in the extended position, being adapted to effectively block the magnetic attractive effect at the tip in a lateral direction without also effecting the magnetic tip in a longitudinal direction. The non-magnetic shield member may be movable with the operating shaft, surrounding the lower end of the magnet or it may be fixed inside a tip opening of the barrel surrounding a portion of the operating shaft and magnet. The non-magnetic shield member is preferably constructed of lead, bismuth or predominantly lead and/or bismuth alloy or material of similar magnetic blocking characteristics.

This apparatus may also be provided with an adjustment means carried by the barrel for positioning the extended position of the magnet with respect to the lower tip opening of the barrel. The adjustment means may comprise a replaceable shim located in separable parts of the barrel which can be unscrewed and replaced to produce an extended position in which the magnet is withdrawn to a small extent into the tip opening. This is sometimes desirable for making it easier to position the tip against the upper surface of certain small button-type batteries which are constructed with a smaller diameter domed portion provided the opening is large enough to receive the upper portion of the dome inside it. In addition to a more secure hold on such a battery, it helps insure the battery is properly located on the tip end of the device. It also provides a way to reduce the magnetic attractive force at the tip itself, if desired, without changing the magnet.

In a preferred embodiment of the present invention, a two-piece elongated non-magnetic barrel is provided with is large enough to be eaily hand hold and manipulated. The barrel is preferably cylindrical though the barrel could be in the form of a polygon. The top piece of a cylindrical barrel attaches to the bottom piece of a cylindrical barrel through a threaded connection. A shim is provided between the upper and lower sections to adjust the space relationship between the upper portion of the barrel with respect to the lower portion of the barrel. The barrel is hollow and preferably has a longitudinal opening and an open tip end.

Within the cylindrical barrel, a non-magnetic shaft is provided. One end of the shaft is adapted to hold a small, cylindrical magnet. The other end is adapted to fit a "click stop" ratchet mounted in the upper end of the barrel. The "click stop" ratchet provides a means to position and lock the shaft in an extended or retracted position. Such a ratchet is found in common ballpoint pens, and is well known in the art. It extends out the upper end of the barrel for operation by the thumb of the same one hand that holds it. Other types of conventional slide mechanisms can be employed.

In the extended position of the preferred embodiment, the magnet on the end of the shaft is flush with the bottom open end of the barrel. In the retracted position, the magnet is retracted into the barrel a sufficient distance to release its magnetic hold on the object. A spring is mounted on the shaft to provide the force necessary to withdraw the magnet into the barrel. The end of the barrel is provided with a reduced diameter ledge which acts as a hook to open small doors on small battery-powered devices for battery replacement.

In operation, the "click stop" ratchet and spring are used to withdraw the magnet into the barrel of the apparatus. The barrel of the apparatus is then placed directly adjacent a flat surface of the battery. The open end in the lower barrel portion serves to align the battery with the longitudinal axis of the apparatus. The ratchet is then used to move the magnet to its extended position thereby bringing it into contact with the battery. Once in contact with the battery, the magnet is held in this position by the locking action of the ratchet.

Once in place, the ratchet is used to withdraw the magnet into the barrel weakening the magnetic field holding the battery because of the greater distance of the magnet from the battery, while retaining the battery in the desired orientation. In its retracted position, the detachment of the battery from the apparatus requires only a small additional force or it falls free of its own weight.

Once the magnet engages the battery, the apparatus may be lifted and manipulated to place the battery in its desired holder in the battery-powered device. The preferred magnet is strong enough in attractive force to withdrawn a battery against the opposing frictional forces of a battery holder such as may be found in a hearing aid. The pickup device advantageously will pick up an eyeglass screw and hold it standing up which helps to position it in its opening.

DETAILED DESCRIPTION OF THE PREFERRED EMBODIMENT

Figure 4:
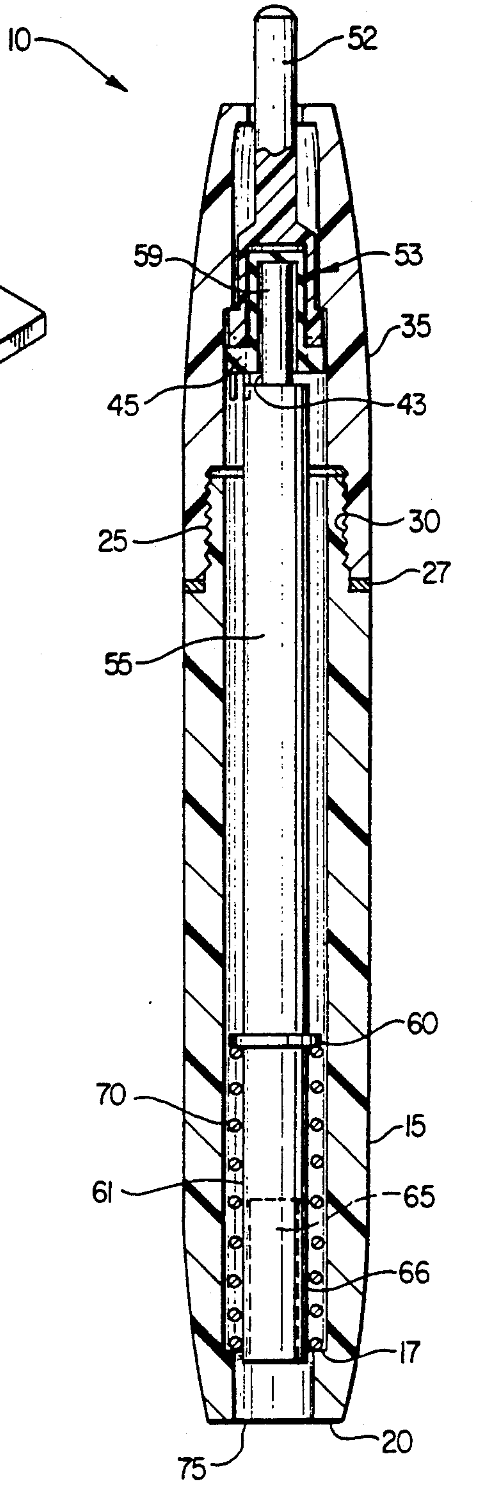
FIG. 4 is a sectional view of the battery replacement apparatus taken along the longitudinal axis of the apparatus.

FIG. 4 illustrates a sectional view of the battery replacement apparatus 10. The apparatus 10 includes a lower barrel portion 15 and an upper barrel portion 35. The lower barrel portion 15 is connected to the upper barrel portion 35 via a set of mating threads 25. Mating threads 25 on the exterior of lower barrel portion 15 fit into receiving threads 30 on the interior portion of the upper barrel portion 35. Between the lower barrel portion 15 and upper barrel portion 35, a shim 27 is provided to adjust the position of lower barrel portion 15 with respect to upper barrel portion 35.

Within upper barrel portion 35 there is a ratchet mechanism 53 which enables the extension and retraction of a magnet 65. The position of the magnet is indicated by the dotted lines in FIG. 4. Ratchet mechanism 53 is commonly found in retractable ball point pens and will only be briefly described here. A specific example is the Fisher-Price Rite Point Century pen R2013.

Figure 6:
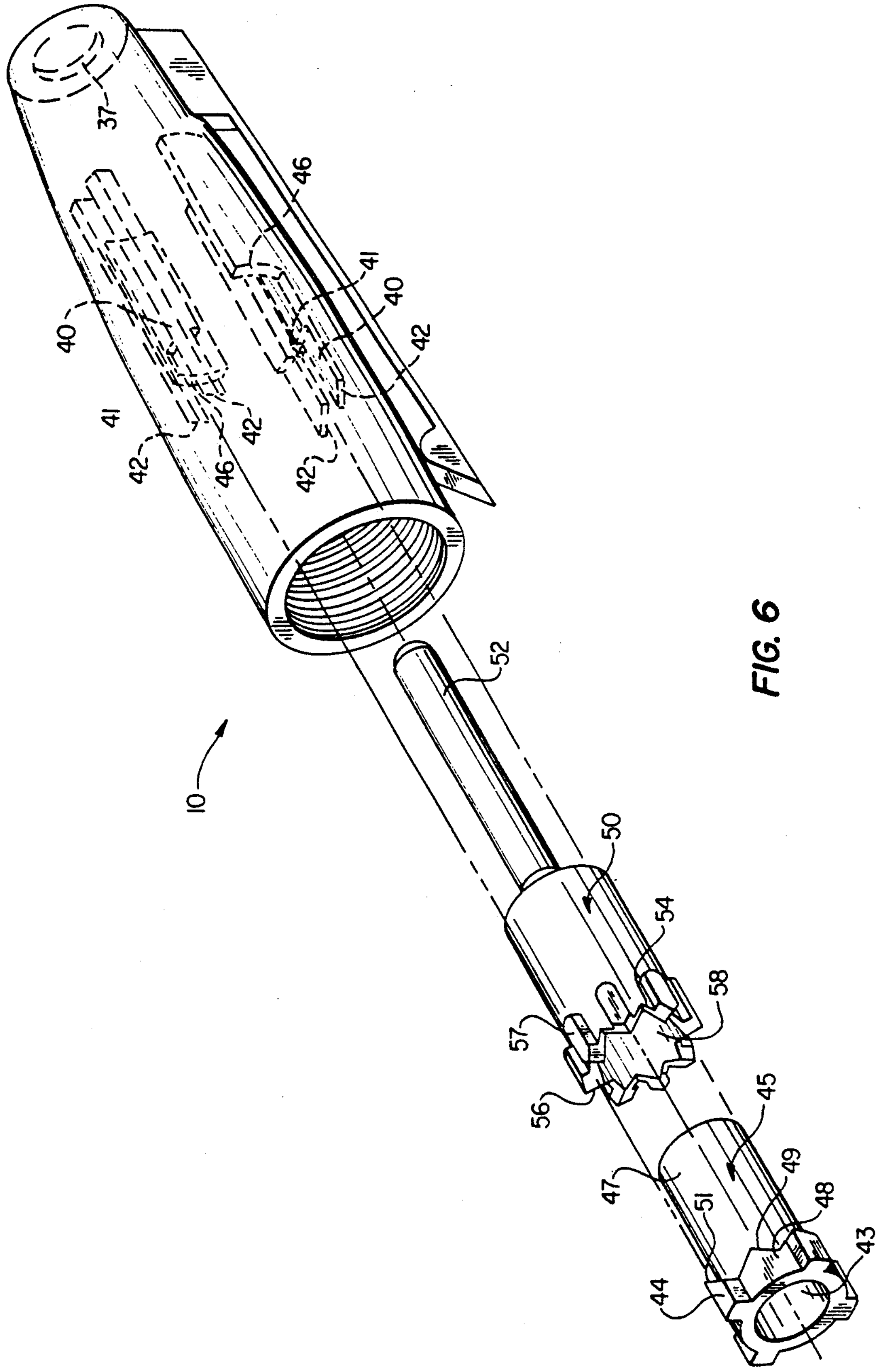
FIG. 6 is an exploded view of ratchet mechanism 53.

In FIG. 6, the three elements which make up the ratchet mechanism 53 in the preferred embodiment are best shown; the ratchet wheel 45, the ratchet driver 50 and the two pair of interprojections 40 provided on the interior of upper barrel portion 35.

Each pair of interprojections 40 is arranged to be parallel with the longitudinal axis of the apparatus and arranged to be diametrically opposed with respect to each other. The angled lower ends 42 of each interprojection form a rotational pawl. Each pair of interprojections 40 is provided with a lower ratchet stop 41. Each lower ratchet stop 41 is formed by a "stair step" between the two interprojections of each pair of interprojections 40.

The interior of barrel portion 35 is also provided with two upper ratchet stops 46. Each upper ratchet stop is placed at a ninety degree angle measured around the longitudinal axis of the apparatus from the two lower ratchet stops 41 provided between each pair of interprojections 40.

As can be seen best in FIG. 6, ratchet driver 50 is provided with an upper portion 52, lower perimeter 54 and open end 58. Around the lower perimeter 54, there is a set of eight downwardly disposed triangular teeth 56. Ratchet driver 50 is also provided with eight guide inserts 57. Each guide insert 57 is placed directly in line with the lower point of each tooth 56. Each guide insert 57 extends outwardly from the circumference of lower perimeter 54.

When the apparatus is assembled, two diametrically opposed guide inserts 57 on ratchet driver 50 are slidably mounted in both opposing pair of interprojections 40 and are constrained by interprojections 40 to reciprocate longitudinally without rotation. At least a portion of upper portion 52 of ratchet driver 50 extends out of the open end 37 of upper barrel portion 35.

FIG. 6 also shows ratchet wheel 45. Ratchet wheel 45 is provided with an upper cylindrical portion 47 and a lower ratchet portion 48. Upper cylindrical portion 47 of ratchet wheel 45 is rotatably inserted into the open end 58 of ratchet driver 50. Lower ratchet portion 48 consists of a set of eight upwardly disposed triangular teeth 49 and four upwardly disposed ratchet teeth 44 placed around its circumference. A ratchet tooth 44 is placed on every other triangular tooth 49 on lower ratchet portion 48. The diameter of the upwardly disposed triangular teeth 49 is slightly larger than that of the upper cylindrical portion 47 of ratchet wheel 45. The diameter of the ratchet teeth 44 is slightly larger than the upwardly disposed triangular teeth 49. The upwardly disposed teeth 49 of ratchet wheel 45 are designed to mate with the downwardly disposed teeth 56 on lower perimeter 54 of ratchet driver 50.

Each ratchet tooth 44 has a sawtooth slanted upper face 51 which is coplanar with one face of the upwardly disposed triangular tooth 49 on which it is placed.

Each ratchet tooth 44 is designed to slide longitudinally within the longitudinal guide formed by each pair of interprojections 40. The slanted upper face 51 of each ratchet tooth 44 is also designed to alternately engage with upper ratchet stops 46 and lower ratchet stops 41. The engagement of the slanted upper face 51 of each ratchet tooth 44 with upper ratchet stops 46 or lower ratchet stops 41 locks the ratchet wheel in a retracted or extended position respectively.

Referring again to FIG. 4, the upper end 59 of shaft 55 is adapted to fit within the lower, open end 43 of ratchet wheel 45. At the lower end 61 of shaft 55, a spring stop 60 is provided. Spring 70 is slidably arranged on shaft 55 and frictionally held in position against spring stop 60 and spring stop 17 provided on the inner surface of lower barrel portion 15. Spring 70 provides a longitudinal force to shaft 55, which translates such force to ratchet wheel 45.

The cooperation of interprojections 40, ratchet driver 50 and ratchet wheel 45 can be described as follows.

By depressing upper portion 52 of ratchet driver 50 into the open end 37 of upper barrel portion 35, the downwardly disposed triangular teeth 56 around the lower perimeter 54 of ratchet driver 50 engage the upwardly disposed triangular teeth 49 of ratchet wheel 45. As the upper portion 52 of ratchet driver 50 is depressed further within open end 37 of upper barrel portion 35, ratchet teeth 44 are pressed out of the longitudinal guide formed by the pair of interprojections 40. Once free of the longitudinal restraint of interprojections 40, the compressive force provided by spring 70 forces the teeth 49 of ratchet wheel 45 upwards into meshing engagement with teeth 56 on ratchet driver 50. The meshing action of triangular teeth 49 and triangular teeth 56 causes ratchet wheel 45 to rotate with respect to ratchet driver 50.

Upon releasing the upper portion 52 of ratchet driver 50, the compressive force of spring 70 again urges ratchet wheel 45 upward. The slanted upper face 51 of ratchet teeth 44 are forced into engagement with the slanted lower ends 42 of interprojections 40. The lower ends 42 of interprojections 40 urge ratchet teeth 44 to further rotate ratchet wheel 45.

As the upper portion 52 of ratchet driver 50 is completely released, the compressive force of spring 70 forces the ratchet teeth 44 into engagement with upper ratchet stops 46. When ratchet teeth 44 engage upper ratchet stops 46, the ratchet wheel 45 and, consequently, shaft 55 and magnet 65 come to rest in their retracted position.

Upon depressing upper portion 52 of ratchet driver 50, the cycle as described repeats, rotating ratchet wheel 45 between its retracted position and its extended position, thereby extending shaft 55 and magnet 65 alternatively as desired.

In the preferred embodiment, ratchet wheel 45, interprojections 40 and ratchet driver 50 provide a means to move and lock magnet 65 in an extended or retracted position. It is understood that many other methods of moving and locking shaft 55 in an extended or retracted position as are known in the art may be substituted for ratchet wheel 45, interprojections 40 and ratchet driver 50 within the current invention without detracting from its utility or functionality. Further methods of moving shaft 55 will not be discussed here further, but are encompassed by the present invention.

As seen in FIG. 4, shaft 55 is provided with a cavity 66 at its lower end. A magnet 65 is mounted in the cavity 66. Generally, magnet 65 is strong enough to provide a sufficient magnetic force to hold battery 95 tightly against ledge 20 when the apparatus is in its extended position, but very loosely against ledge 20 or not at all when the apparatus is in its retracted position.

In the best mode of the apparatus, magnet 65 is a small, preferably cylindrical neodymium (Nd-Fe-B) permanent magnet preferably having at least residual flux density (Br) of about 11.5 kilogauss (KGs), coercive force (Hc) of about 9 kilo oersteds (KOe), intrinsic coercive force (Hci) of about 15 kilo oersteds (KOe) and a maximum energy product (BHmax) of about 26–36 mega gauss-oersteds (MGOe).

Ideally, in the preferred embodiment, magnet 65 should be flush with opening 75 of lower barrel portion 15 when the apparatus is placed in its extended position. In order to achieve the flushness required between magnet 65 and open end 75, shim 27 is provided surrounding mating threads 25,30 and fitting between lower barrel portion 15 and upper barrel portion 35 when apparatus 10 is assembled. Shim 27 may be supplied with varying widths. The varying widths of shim 27 allow lower barrel portion 15 to be adjusted with respect to magnet 65 in order to bring magnet 65 flush with or a fixed distance from open end 75 of lower barrel portion 15. Opening 75 may be designed to accept a raised upper portion 100 of a circular battery in which case the magnet 65 may be adjusted upwardly slightly to allow the remainder of the battery to rest against ledge 20. It should be noted that certain peculiar shaped magnets may be used in the apparatus without harming its practicality or functionality. Such magnets may obviate the need for the magnet being flush with opening 75 of lower barrel portion 15.

In operation of the preferred embodiment, magnet 65 is placed in its retracted position in apparatus 10. Open end 75 of apparatus 10 is then placed directly adjacent the slightly raised portion 100 of battery 95. It should be noted that batteries not having a raised portion 100 as shown in FIG. 2 may also be held and manipulated by apparatus 10.

Figure 5:
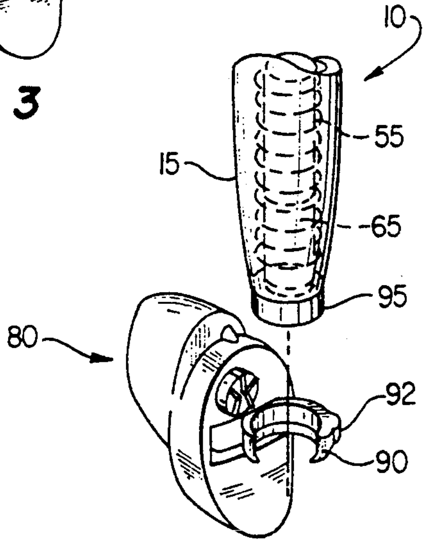
FIG. 5 is a view of the hearing aid of FIGS. 2 and 3 showing a battery held by the magnet at the end of the battery replacement apparatus ready to be inserted into the open battery compartment.

Ratchet driver 50 is then depressed and released locking magnet 65 into its extended position. This extended position brings magnet 65 into contact with the slightly raised portion 100 of battery 95. The attractive coercive force provided by magnet 65 attracts and holds the battery against the open end 75 of lower barrel portion 15. Once the battery is magnetically held with the battery in contact with the ledge 20 of lower barrel portion 15, the battery may be elevated and apparatus 10 may be used to place the battery into the open door 90 of hearing aid 80, a battery holding device, as indicated in FIG. 5. Once in place, magnet 65 may be withdrawn into lower barrel portion 15 by depressing and releasing ratchet driver 50, thereby locking magnet 65 into its retracted position and allowing the easy removal of magnet 65 from the battery.

Figure 3:
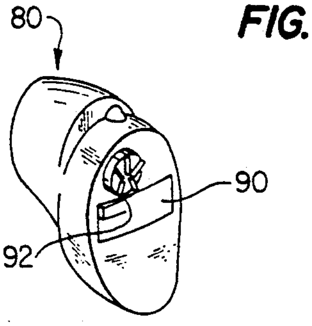
FIG. 3 is a perspective view of the hearing aid of FIG. 2, the hearing aid having the battery compartment closed.

In order to remove a battery from a small battery-operated device such as hearing aid 80 as illustrated in FIG. 3, it is necessary to open the door 90 which conceals the battery 95. The ledge 20 formed in the lower barrel portion 15 has a sharp edge which may be used to open door 90 in the device 80. Ledge 20 is placed directly adjacent projection 92 on door 90. Apparatus 10 may then be used to pry open door 90 exposing battery 95.

Figure 1:
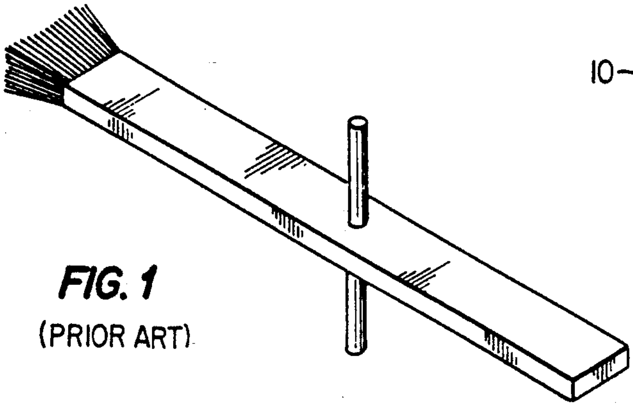
FIG. 1 (PRIOR ART)
FIG. 1 is a perspective view of the prior art.
Figure 2:
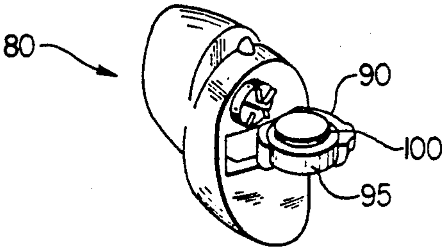
FIG. 2 is a perspective view of a hearing aid having an open battery compartment.

As seen in FIG. 2, once battery 95 is exposed, apparatus 10 is then positioned directly above door 90 and directly above battery 95. Open end 75 formed in the lower barrel portion 15 serves to align the device 10 with the vertical axis of battery 95. This alignment is accomplished by the slightly raised portion 100 of battery 95 fitting within open end 75 when lower barrel portion 15 is brought into contact with battery 95.

Figure 7:
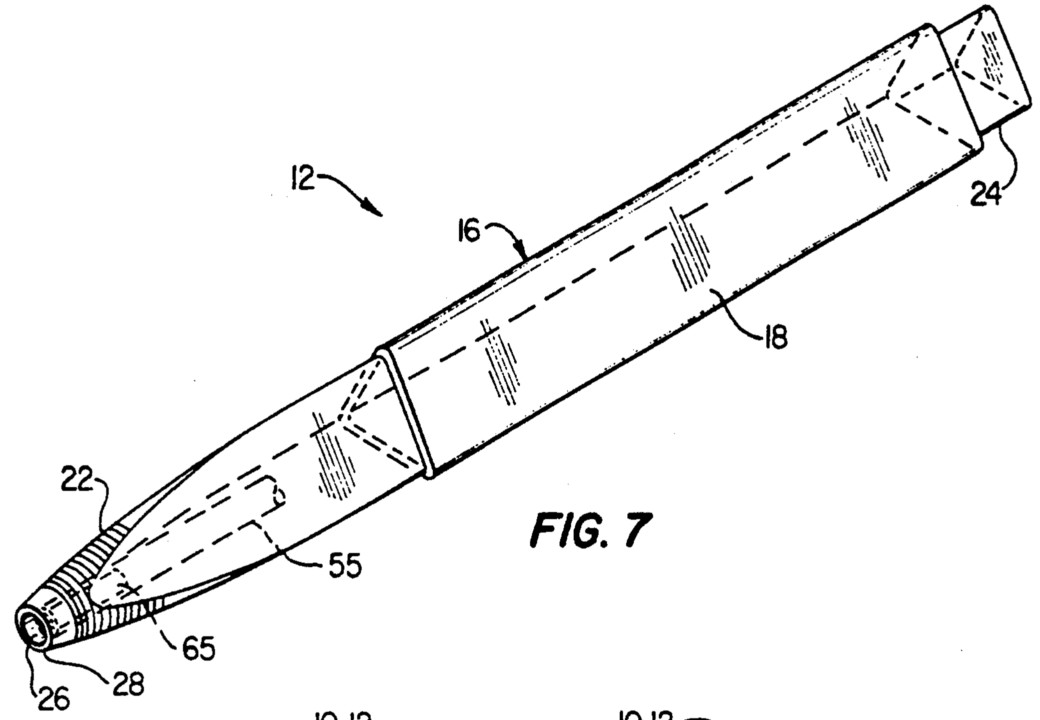
FIG. 7 is a perspective view of an embodiment having a triangular cross-section in the upper portion with a circular cross-section at the tip in order to minimize the diameter at the tip.

In FIG. 7 is a triangular battery replacement and pickup apparatus generally designated by the reference numeral 12. It has a generally triangular shaped barrel 16 having a triangularly shaped cross-sectional upper portion 18 and a generally circularly cross-sectioned lower section 22. It has a push button 24 of an internal ratcheting and locking mechanism which is conventionally provided to alternately move the shaft 55 with its magnet 65 into the extended or retracted position in response to depression of the push button. Shaft 55 and magnet 65 move longitudinally within the hollow barrel and in the extended position the extreme lower end of the magnet is preferably flush with opening 26 formed by wall 28 at the tip. The magnet and shaft holding it may be slightly smaller than the diameter of the tip opening 26 to avoid any possibility of small parts getting stuck between the walls and the shaft to interfere with the reciprocating motion in response to the ratchet mechanism operated by the push button.

Figure 8:
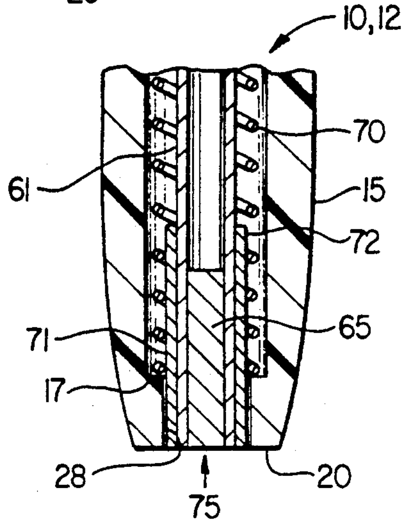
FIG. 8 is a cutaway cross-sectional view of the tip of a magnetic pickup device which is provided with a non-magnetic shield extending from the open end of the tip along the outer surface of the shaft.

FIG. 8 shows the cross-sectional view of the tip portion of a variation of the invention using the reference numerals of FIG. 4. This could be the tip of a shape variation of the type shown in FIG. 7. In FIG. 8 lower barrel portion 15 has an opening 75 having a lower tip end wall which will be called 28 which defines opening 75. The longitudinally extending walls 28 have an offset which creates ledge 17 on which the end of spring 70 rests. Shaft 55 is a hollow shaft in which magnet 65 is held with one of its flat ends coterminous with the lower end portion 61 of shaft 55. It is shown in the extended or pickup position.

Surrounding the cylindrical outer diameter of shaft end portion 61 within spring 70 is a cylindrical non-magnetic shield member 72 which is also coterminous with the lower end of shaft 61 and a flat surface at the end of magnet 65. Non-magnetic shield member 72 preferably extends slightly beyond the opposite end of magnet 65 as shown. It may be frictionally or otherwise attached to the outer diameter of shaft 61 to move therewith. The material for shield 72 and its thickness is adapted to effectively block the magnetic attractive effect at the tip in a lateral direction without also effecting the magnetic effect at the tip in the longitudinal direction where the arrow 75 is shown. It has surprisingly been found that lead effectively blocks the sideward effect of a magnet in attracting steel parts. It is believed that materials such as Bismuth or lead or combinations of them and alloys which are predominantly Bismuth or lead or combinations of them apparently block the magnetic flux emanating from the end of the magnet in a way that is not completely understood. It is known that bismuth, for example, is a highly diamagnetic material.

Figure 9:
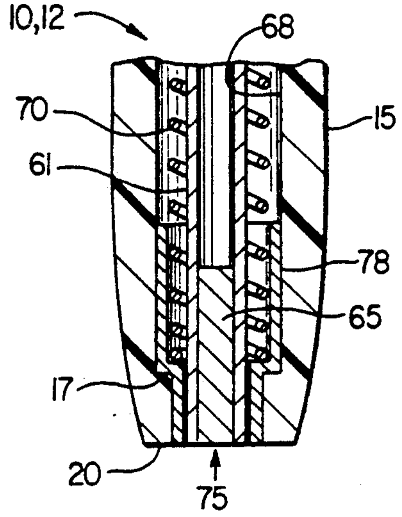
FIG. 9 is an alternative version of the non-magnetic shield which is fixedly attached inside the barrel at the tip surrounding the shaft and magnet.
Figure 10:
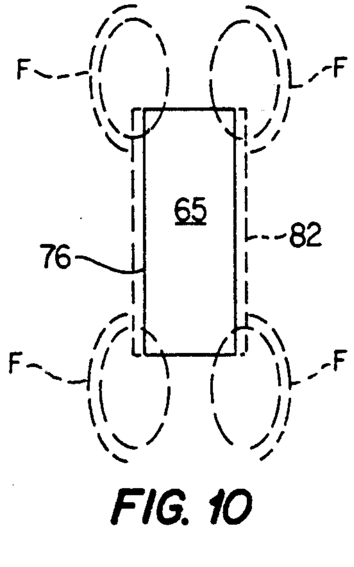
FIG. 10 is a schematic illustration to indicate the general kind of magnetic field that prevails at the opposite poles of a cylindrical magnet and schematically illustrates the presence of a non-magnetic barrier layer around the magnet.

A magnetic effect is generally and schematically shown graphically in FIG. 10 insofar as it applies to the high energy (BHmax) neodymium type magnets which are preferably employed. The oval shaped areas in FIG. 10 schematically represent the magnetic field at the tip which is believed to be blocked in a sideward or lateral direction by the presence of the non-magnetic shield. The practical effect is that if the apparatus 10, 12 were placed in a vertical orientation with tip opening 75 against a horizontal surface and the magnet in the extended pickup position, a magnetic battery placed adjacent the outer side surface of barrel 15 would either not be attracted or be attracted so weakly that it would fall off under its own weight or with very little effort applied. On the contrary, if the magnet in the extended position shown in FIG. 8 were placed longitudinally directly on top of the magnetic object, such as a battery, it would be strongly attracted and held until the magnet was separated by retraction whereupon it would be released. The presence of the shield member makes it possible to use a smaller lower barrel portion 15 with a smaller diameter so that the whole device can be built about the size of an ordinary pocket clip ballpoint pen. The effect created by non-magnetic shield 72 and shield 78 in FIG. 9 is greater than that caused solely by the lateral separation of a sidewardly oriented magnetic object from the magnet which, of course, also reduces the magnetic attraction force applied.

FIG. 9 shows an alternative construction of a non-magnetic shield member 78 which in all respects is like the one shown in FIG. 8 except that shield 78 is fixed in the tip of the pen and does not move with the reciprocation of lower shaft 61 and magnet 65. It is also coterminous with the end of the tip but has an outwardly laterally angled portion which coincides with ledge 17 and extends upwardly following the inside surface 68 of barrel 15. It is larger in diameter and surrounds spring 70 which actually rests on the angled portion, supported by ledge 17.

In FIG. 10, the magnetic flux at the end corners of magnet 65 are indicated by the letter F. These lines of flux tend to be concentrated at the corner ends and not in the middle of the magnet. The preferred neodymium type magnets which have great attractive force tend to have this pattern. Even though the magnetic flux is believed to be blocked by the magnetic shield so as to extend only longitudinally with respect to magnet 65 and not laterally, the exact shape and extent of these flux lines is not actually understood, but the effect is as though they were blocked by the shield member. That is to say that with the construction of FIGS. 8 or 9, without the shield member, the tip would attract magnetic parts at the side of the tip and with the non-magnetic shield it will not or will attract so weakly as to not cause problems with errant pickup which necessitates hand manipulation to get the part back around to opening 75 so that it can be properly manipulated.

FIG. 10 also illustrates the use of a barrier coating layer 82 which surrounds side wall 76 of magnet 65. This can also serve as a non-magnetic shield member and can be supplied as a layer of solder on the outside of the magnet taking care to not overheat the magnet such that its coercive force would be reduced. Barrier layer 82 might also be provided by wrapping the outer surface of the magnet to build up sufficient thickness always leaving at least the terminal lower end of magnet 65 open so that the magnet picks up at the open end. Barrier layer 82 can be a substitute for non-magnetic shield members 72, 78 or they can be used in combination or in combination with a thickened tip to eliminate any stray laterally extending magnetic field that would permit errant pickup from the sides. Any combination of a thickened plastic barrel 15, a non-magnetic barrier coating 82 or shield 72, 78 is within the scope of the invention. They should be selected to optimize the minimal side pickup propensity.

In the best mode, some dimensions of a typical battery pickup device without the non-magnetic shield member may be helpful to understand the invention. Shaft member 55, 61 is a thin brass tube having an inside diameter 71 of about 0.105" which is also approximately the outside diameter 76 of magnet 65. The outside diameter of the shaft tube was about 0.122". The magnet was fixed inside the open end of the tube with suitable adhesive. The magnets are commonly made by powder metallurgy techniques and can be provided to a small tolerance in diameter variation. The outside diameter of the ABS plastic lower barrel portion 15 was 0.250" in one example which utilized a HENNEO 35 magnet to make a battery pickup device. It exhibited some undersirable pickup propensity from the side. It is estimated that a thickening of the lower barrel tip to about 0.300" would be required to reduce the side pickup propensity of this structure to an acceptable degree. This was compared by putting a donut-shaped plastic part around the tip of the barrel which reduced the sideways pickup propensity. Some experimentation may be necessary to select the best materials for blocking the sideward magnetic pulling effect of the magnet. It is believed that better materials for this purpose are materials such as bismuth and lead as compared to air. Plastic such as ABS plastic is not as effective for this purpose but also exhibits a blocking effect which is believed to be related to density of the plastic, with greater density being helpful in this regard. Materials such as aluminum or copper are believed to have very little, if any, effect in reducing the sideward magnetic pulling effect when interposed between a magnet and a magnetically attractable part.

A lead shield which significantly reduced the side attraction was placed all around the side surface of the magnet and estimated to have a thickness of about 0.050–0.100" in a test. This had the effect of substantially weakening the magnetic field of the side direction without having any effect on the attractive pull at the tip. It did not completely eliminate the side attraction but weakens the side pickup propensity of attractive pull from the side to an acceptable amount. A thicker shield would be expected to have a greater weakening effect. Use of the shield should make a smaller tip diameter possible without increasing undesirable side directed attractive forces.

The magnets are obtained from Hennaco Industrial Enterprises, Inc., 5 Highview Court, Montville, N.J. 07045, U.S.A. A copy of the magnet supplier's chart entitled "Magnetic and Physical Characteristics of HENNECO (Nd-Fe-B)" is attached hereto and incorporated by reference. These magnets are sold under the trade name Henneo, and those referred to a Henneo 30 or Henneo 35 are believed to make good magnets for this application with the HENNEO 35H being most desirable because it has enough magnetic attraction force to pull small hearing aid batteries out of the retaining socket even when they are tightly frictionally held therein. An intrinsic coercive force of about 15 KOe or greater is preferred in order to have sufficient magnetic strength for this purpose. Where this is not such a problem an intrinsic coercive force of about 9 KOe would be suitable. These magnets provide an extremely powerful attractive force in an extremely small package. It doesn't matter which pole of the magnet is used at the top, but it is important that the face on the end of the magnet be perpendicular to the long axis within a very close tolerance of about ±0.002 inches because otherwise there is created a non-uniform magnetic field that exaggerates the undesirable side attraction. A non-uniform field may also be created if the magnets are not properly aligned when they are magnetized initially.

It should be noted that the shield surrounding the magnet must not be made of magnetic material (magnetizable) such as steel, because it traps the magnetic field in a way that results in undesirable magnetic side attraction at the tip even when the magnet is retracted. It seems that if steel were used as the shield the magnetic effect is transferred to the shield all up and down the length of the ferromagnetic steel shield even when the magnet is in the retracted position.

I claim:

1. A magnetic pickup apparatus comprising:

an elongated barrel having an open lower end;

an elongated non-magnetic shaft movable longitudinally within said barrel between an extended position and a retracted position, said shaft having a hollow lower end portion;

a magnet disposed substantially entirely within the hollow lower end portion of said non-magnetic shaft for movement therewith, a lower end of said magnet being generally flush with the open lower end of the barrel for magnetic connection with a magnetically attractable item when said movable shaft is moved to the extended position;

a ratchet locking means operatively disposed within said barrel for alternately holding said non-magnetic shaft in said extended or retracted position; and biasing means located within said barrel for urging said non-magnetic shaft toward said retracted position, wherein a magnetically attractable item may be picked up and securely held by the magnet when said non-magnetic shaft is in the extended position, and released when said non-magnetic shaft is in the retracted position.

2. The magnetic pickup apparatus of claim 1 wherein said magnet has a flat lower end surface which is exposed at the open end of the barrel when said non-magnetic shaft is in the extended position.

3. The magnetic pickup apparatus of claim 2 wherein the magnet is a neodymium based permanent magnet having a coercive force (iHc) of at least about 15 KOe.

4. The magnetic pickup apparatus of claim 2 wherein said ratchet locking means comprises:

pawl means rigidly attached to the interior of the barrel;

ratchet means operatively connected to said non-magnetic shaft for movement therewith in and out of contact with said pawl means; and said ratchet means operatively contacting said pawl means by force applied by said biasing means.

5. The magnetic pickup apparatus of claim 4 wherein the lower open end of the barrel is formed as a ledge that may be used for opening a battery compartment of a heating aid.

6. The magnetic pickup apparatus of claim 4 wherein a lower portion of the barrel comprises a non-magnetic material.

7. The magnetic pickup apparatus of claim 6 wherein the lower portion of the barrel is thickened around the magnet to an extent that effectively prevents said magnet from picking up a magnetically attractable item which is located outside of the lower portion of the barrel without reducing the magnetic pickup force at the lower open end so that when the magnet is in the extended position it will pickup a magnetically attractable item only at the open end of the barrel.

8. The magnetic pickup apparatus of claim 7 wherein the magnet has a coercive force (iHc) of at least about 15 KOe.

9. The magnetic pickup apparatus of claim 1, further comprising an adjustment means carried by the barrel for adjusting the extended position of the magnet with respect to the open lower end of the barrel.

10. The magnetic pickup apparatus of claim 9 wherein said adjustment means comprises a replaceable shim located between separable parts of said barrel.

11. The magnetic pickup apparatus of claim 9 wherein said ratchet locking means comprises:

pawl means rigidly attached to the interior of the barrel;

ratchet means operatively connected to said non-magnetic shaft for movement therewith in and out of contact with said pawl means; and said ratchet means operatively contacting said pawl means by force applied by said biasing means.

12. The magnetic pickup apparatus of claim 1 wherein the magnet has a coercive force (iHc) of at least about 9 KOe.

13. A hand held pickup apparatus comprising:

an elongated non-magnetic hollow barrel having a tip opening;

an elongated operating shaft adapted to move longitudinally within said barrel between an extended position and a retracted position in response to the action of an operating mechanism attached to the barrel and operable by the hand that holds the apparatus, the operating shaft having a hollow lower end portion;

a magnet disposed substantially entirely within the hollow lower end portion of the operating shaft for movement therewith between an extended position wherein a lower end of the magnet is generally flush with the tip opening of the barrel, and a retracted position wherein the lower end of the magnet is withdrawn into the barrel a magnetically significant distance from the tip opening.

14. The hand held pickup apparatus of claim 13, further including an adjustment means carried by the barrel for adjusting the extended position of the magnet with respect to the tip opening of the barrel.

15. The hand held pickup apparatus of claim 14, wherein said adjustment means comprises a replaceable shim disposed between separable parts of said barrel.

16. A hand held device for manipulating small magnetically attractable items, comprising:

a hollow elongated housing having a finger operable plunger at one end, the housing having a tip portion at the other end having a peripheral wall defining an opening therein;

a positioning shaft supported within the housing for longitudinal movement therein in response to operation of the plunger, the shaft having a hollow lower end portion;

a magnet disposed substantially entirely within the hollow lower end portion of the positioning shaft for longitudinal movement within the tip portion of the housing between a pickup position and a release position;

biasing means operative to bias the positioning shaft and magnet to the release position with sufficient force so as to overcome magnetically attractable attraction between the magnet and a magnetic item;

locking means for selectively holding the positioning shaft and magnet in one of the pickup position or the release position which is established in response to operation of the plunger; and the lower tip portion of the housing being made of a material and sized to effectively block a magnetic attractive force extending laterally from the magnet when the magnet is in the pickup position so that the magnet will not attract magnetic items from the side of the housing.

17. The hand held device of claim 16 wherein the magnet has a maximum energy product (BHmax) of at least about 26 MGOe.

* * * * *

UNITED STATES PATENT AND TRADEMARK OFFICE
CERTIFICATE OF CORRECTION

PATENT NO. : 5,288,119
DATED : February 22, 1994
INVENTOR(S) : Crawford, Jr., et al.

It is certified that error appears in the above-indentified patent and that said Letters Patent is hereby corrected as shown below:

In column 13, line 13, delete "heating" and add --hearing--.

Signed and Sealed this

Fourteenth Day of June, 1994

Attest:

BRUCE LEHMAN

Attesting Officer

*Commissioner of Patents and Trademarks*